United States Patent [19]

Cheetam et al.

[11] Patent Number: 5,740,078
[45] Date of Patent: Apr. 14, 1998

[54] METHOD AND SYSTEM FOR DETERMINING OPTIMUM COLORANT LOADING USING MERIT FUNCTIONS

[75] Inventors: William Estel Cheetam, Clifton Park, N.Y.; John Frederick Graf, Vienna, W. Va.

[73] Assignee: General Electric Company, Schenectady, N.Y.

[21] Appl. No.: 573,978

[22] Filed: Dec. 18, 1995

[51] Int. Cl.⁶ .................................................. G01J 3/46
[52] U.S. Cl. ............................ 364/526; 356/402; 356/425
[58] Field of Search ........................... 364/526; 356/402, 356/405, 406, 407, 425; 395/207, 208, 605, 606, 615

[56] References Cited

U.S. PATENT DOCUMENTS

| | | | |
|---|---|---|---|
| 3,601,589 | 8/1971 | McCarty | 364/526 |
| 3,916,168 | 10/1975 | McCarty et al. | 364/526 |
| 4,653,014 | 3/1987 | Mikami et al. | 364/526 |
| 4,813,000 | 3/1989 | Wyman et al. | 356/402 |
| 4,887,906 | 12/1989 | Koehler | 364/526 |
| 5,067,067 | 11/1991 | Estelle et al. | 364/156 |
| 5,311,437 | 5/1994 | Leal et al. | 395/208 |
| 5,499,366 | 3/1996 | Rosenberg et al. | 395/605 |
| 5,502,642 | 3/1996 | Dichter | 364/526 |
| 5,541,848 | 7/1996 | McCormack et al. | 395/207 |
| 5,546,564 | 8/1996 | Horie | 395/208 |

*Primary Examiner*—James P. Trammell
*Assistant Examiner*—Eric W. Stamber
*Attorney, Agent, or Firm*—David C. Goldman; Marvin Snyder

[57] ABSTRACT

The present invention discloses a method and system for determining the total colorant loading and relative colorant proportions for a color formula that is used for reproducing a color standard. In the present invention, a spectrophotometer measures the spectral reflectance of the color standard. A plurality of color matching attributes are then specified and used for attaining a match with the color standard. A merit function scale for quantifying how well a previously used color match corresponds to the color standard is developed. The merit function scale includes qualitative descriptions for the color matching attributes and a corresponding range of quantitative values. Next, a database of previously used color matches are searched and the merit function scale is used for determining a set of color matches that best approximates the color standard. A color match is determined from the set of previous color matches that optimally reproduces the color standard. The colorant loading and relative colorant proportions of the color formula from the color match are then used to reproduce the color standard.

17 Claims, 3 Drawing Sheets

METHOD AND SYSTEM FOR DETERMINING OPTIMUM COLORANT LOADING USING MERIT FUNCTIONS

BACKGROUND OF THE INVENTION

The present invention relates generally to color formulation development and more particularly to determining the total colorant loading and relative colorant proportions for a color formula that can optimally reproduce a color standard in accordance with desired property and appearance specifications.

In color formulation development, a standard is the color sample to be matched. A color standard is usually reproduced by selecting a set of colorants and loadings that can produce the color of the standard under all lighting conditions. Typically, the selection of colorants for reproducing the color standard has been accomplished by using one's accumulated working experience. In this approach, a color formula specialist uses their knowledge and experience to select the combination of colorants for reproducing the color standard. However, this approach is not easily implemented by less experienced specialists. In addition, the accumulated working experience approach suffers from the inability to evaluate a large number of alternative colorant combinations and has unwarranted human biases towards particular colorants. Thus, any colorants that are selected in this manner would probably not be able to optimally produce the color standard.

Some of the disadvantages of the accumulated working experience approach have been avoided by using a computer to determine colorant loading proportions for a color formula that can produce the color standard. Typically, the computer uses software programs based on the Kubelka-Munk theory which describes how absorption and scattering of colorants in a color standard are related to the visible spectral curve and its color. According to the Kubelka-Munk theory, each colorant contributes to the absorption and scattering of the standard, with each colorant's contribution being proportional to the amount of its presence multiplied by an absorption and scattering coefficient. The software programs using the Kubelka-Munk theory use a standard least squares fitting routine to determine what proportions of each colorant to add to produce the desired spectral reflectance curve and color. A problem with this approach is that it takes into account only one factor (i.e. the spectral color curve) when trying to satisfy the colorant formula. However, in a typical situation, there are many other important properties that need to be optimized when trying to satisfy the colorant formula. For example, properties such as cost, optical density, color shifts due to different processing conditions, surface gloss, color adjustability, stabilization, and ultra-violet light protection, have a role in the satisfaction of a colorant formula. By taking only the spectral color curve factor into account and not properties such as cost, optical density, color shift, adjustability, etc., the present computer approaches are unable to find the total colorant loading and relative colorant proportions for a color formula used to optimally reproduce a specified color standard.

SUMMARY OF THE INVENTION

Therefore, there is a need for a procedure that can determine what set of colorant loadings is required to optimally meet all needs for the color formula in the application of the color standard taking into account the above-mentioned properties. The present invention has fulfilled this need by using a merit function scale to determine colorant loadings which is general enough to any number of color matching properties. In addition, the present invention enables users to emphasize one color matching property more than another if desired.

Thus, in accordance with the present invention, there is provided a method and system for determining the total colorant loading and relative colorant proportions for a color formula that is used for reproducing a color standard according to desired property and appearance specifications. In the present invention, a spectrophotometer measures the spectral reflectance of the color standard. A plurality of color matching attributes are then specified and used for attaining a match with the color standard that are in accordance with the desired property and appearance specifications. A merit function scale for quantifying how well a previously used color match corresponds to the color standard is then developed. The merit function scale comprises a plurality of qualitative descriptions for the plurality of color matching attributes and a corresponding range of quantitative values. Next, a plurality of previously used color matches are searched and the merit function scale is used to determine a set of color matches that best approximates the color standard. A color match is then determined from the set of previous color matches that will optimally reproduce the color standard. The colorant loading and relative colorant proportions of the color formula from the color match are then used to reproduce the color standard.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
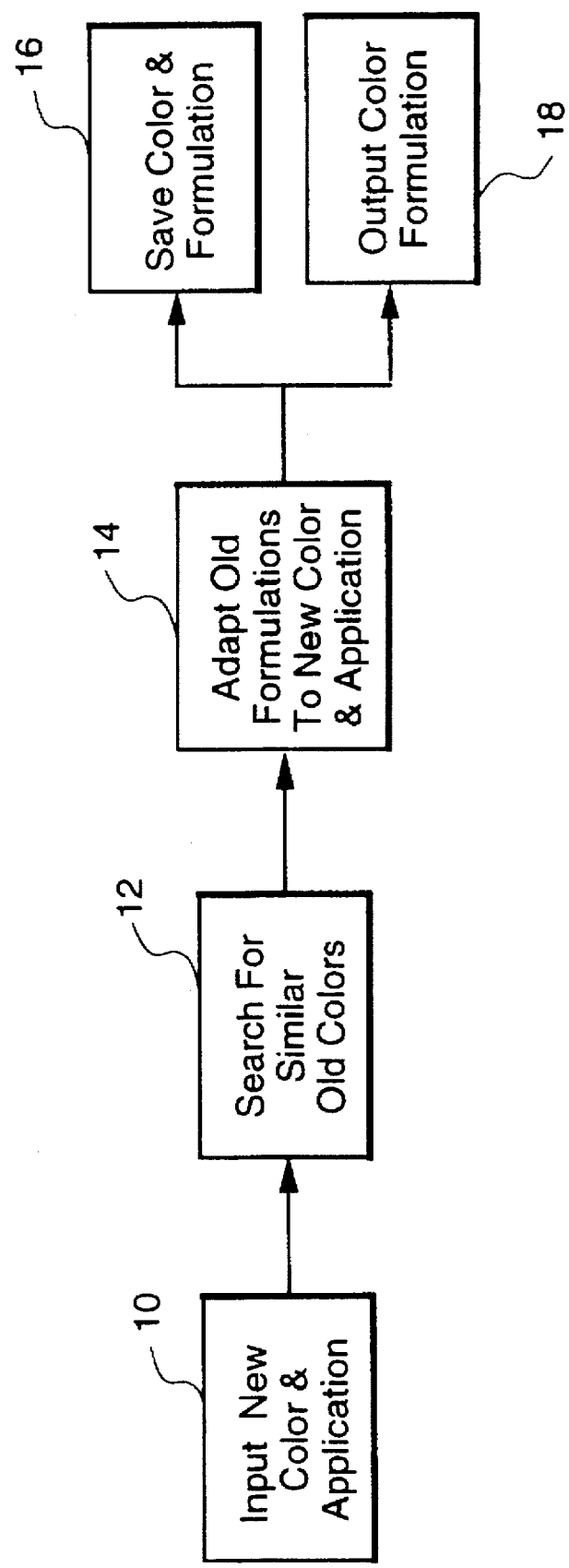
FIG. 1 is a block diagram describing a search process used in the present invention.

A block diagram describing the search process used in the present invention is shown in FIG. 1. At 10, a color standard made from a material such as plastic, paper, cloth, ceramic, or the like, having a new color is received. The standard is the color sample to be matched. Given the color, the present invention searches a database at 12 containing previously run matches having varying colors to identify cases which may provide the best match to the desired color. The present invention then adapts the colorant loadings (i.e., pigments) of the closest cases at 14 to provide the best match with the desired color. Then the adapted color formulation is saved at 16 and the color formula with the highest probability of success is outputted to a user at 18. A more detail discussion of the color formulation process is provided in U.S. patent application Ser. No. 08/538,493 (RD-24,621) now U.S. Pat. No. 5,668,633, entitled "A Method and System for Formulating A Color Match", which is incorporated herein by reference.

Figure 2:
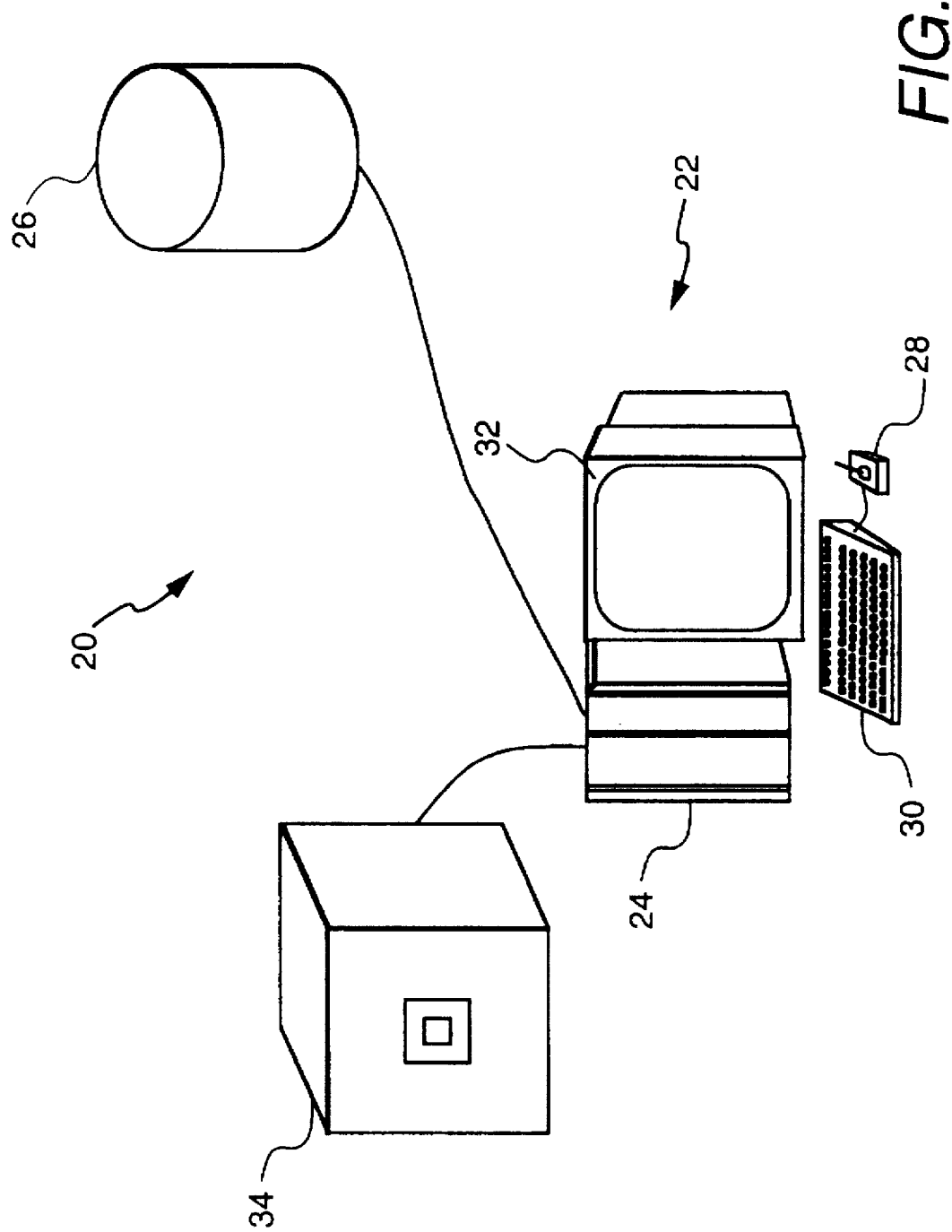
FIG. 2 is a diagram illustrating the system used in the present invention.

FIG. 2 is a diagram illustrating a system 20 used in the present invention. The system includes a processor 22 such as a personal computer having a 80386 processor or higher and a spectrophotometer 34 such as a MacBeth®7000 or 2020 spectrophotometer. In the preferred embodiment of the present invention, a 486 CPU 50 MHz personal computer with 8 megabytes of RAM provides the best results. The processor is run by application software embodied in a hard disk 24 such as Microsoft MS-DOS® version 3.1 operating system or later version or Microsoft Windows® operating system. A user communicates with the processor 22 and a database 26 by a mouse or other pointing device 28 and a keyboard 30. The database 26 contains the plurality of previously used color matches with their respective spectral reflectance curves and color formulas. The user with the mouse 28 and keyboard 30 specifies a plurality of color matching attributes that are required for attaining a match with the color standard measured by the spectrophotometer. The processor 22 contains a merit function scale in memory for quantifying how well a previously used color match stored in the database 26 corresponds to the color standard. The processor 22 then searches a plurality of previously used color matches stored in the database 26 and uses the merit function scale for determining a set of color matches that best approximates the color standard. A color match is determined from the set of previous color matches that can optimally reproduce the color standard. The colorant loading and relative colorant proportions of a color formula from the color match are then used to reproduce the color standard. The results from the processor can be displayed on a display 32.

Figure 3:
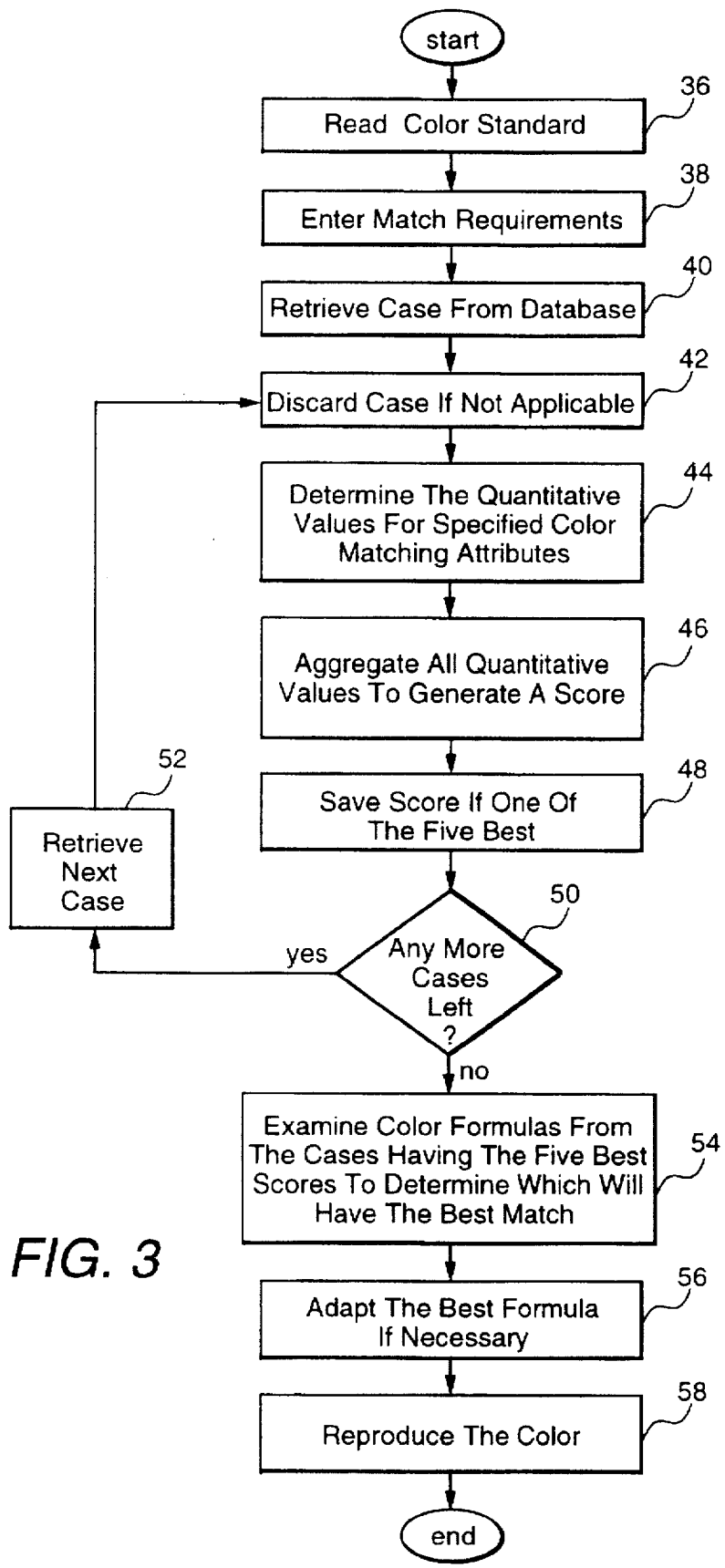
FIG. 3 is a flow chart illustrating the operation of the present invention.

FIG. 3 is a flow chart illustrating the process of determining optimum colorant loading in the present invention. The process starts at 36 where the color standard is placed in the spectrophotometer 34 and its spectral reflectance is measured. Next, requirements for attaining a color match with the color standard that are in accordance with desired property and appearance specifications are entered into the processor 22 by using the mouse 28 and the keyboard 30 at 38. In particular, the user specifies the relative importance of color matching attributes with a weighting factor. In the illustrative embodiment, the color matching attributes that are taken into account are the spectral color curve match, total colorant loading, cost of colorant formula, optical density of color, color shift during molding, metamerism, and adjustability. The weighting factor applied to each color matching attribute signifies its importance to the user in the color matching process. For example, if cost is very important and the spectral color curve match is less important for a specific case, then a weighting factor can be used to put more emphasis on cost than on the spectral color curve match.

Next, the processor 22 accesses the plurality of cases of previously used color matches from the database 26. In the illustrative embodiment of the present invention, the database 26 contains about 2000 cases of previously used color matches. Each of the color matches contain a respective spectral reflectance curve and a color formula. At 40, the processor 22 retrieves a case for further examination. If the case is not applicable to the color standard, then it is discarded at 42 from further review. In particular, if the case has a spectral reflectance curve that is not similar to the reflectance of the standard, then all further examinations of the case are stopped because the chance of it being used as a match with the standard are remote.

At 44, the processor 22 determines the quantitative values for all of the color matching attributes specified at step 38. The quantitative values are determined by using a merit function table. A merit function quantifies how good or bad a particular color formula matches a color standard within property and appearance specifications. Since good or bad are qualitative terms, the merit function characterizes qualitative descriptions of a color formula within quantifiable values. In the illustrative embodiment, a generic global merit function scale as set forth in Table 1 is used by the processor 22 to compare color matching attributes that are based on entirely different scales such as cost and spectral curve match.

TABLE 1

Global Merit Function Scale

| Qualitative Description | Quantitative Value Range |
|---|---|
| Excellent | ≦5 |
| Good | >5 and ≦25 |
| Average | >25 and ≦75 |
| Poor | >75 and ≦100 |
| Reject | >100 |

In Table 1, a color matching attribute having an excellent qualitative description has a quantitative value that is less than or equal to 5; a color matching attribute having a good qualitative description has a quantitative value that is greater than 5 and less than or equal to 25; a color matching attribute having a an average qualitative description has a quantitative value that is greater than 25 and less than or equal to 75; a color matching attribute having a poor qualitative description has a quantitative value that is greater than 75 and less than or equal to 100; and a color matching attribute having a reject qualitative description has a quantitative value that is greater than 100.

Each color matching attribute that is specified has to be scaled to the global merit function scale set forth in Table 1. This is accomplished by mapping the quantified values of a particular color matching attribute with the qualitative descriptions provided in Table 1. An example of mapping a color matching attribute with the global merit scale is now described for the color cost attribute which is measured in cents per pound. An excellent color formula could be a formula having a very low coloring cost and a poor formula could be a formula having a very high coloring cost in cents per pound. The mapping of the color cost matching attribute to the global merit function scale may be specific for particular color families. An example of the mapping for the red and blue color families to the global merit function scale is provided in Table 2.

TABLE 2

Mapping Cost Attribute with the Global Scale

| Qualitative Value | Quantitative Value Range | Red Color Cost (¢/lb) | Blue Color Cost (¢/lb) |
|---|---|---|---|
| Excellent | 5 | 4.5 | 2.0 |
| Good | 25 | 9.0 | 3.5 |
| Average | 75 | 25.0 | 10.0 |
| Poor | 100 | 72.0 | 28.0 |

Table 2 shows quantitative values for color costs for the red and blue families. For example, for the color red, a color formula at 4.5 ¢/lb of material will have an excellent formula quantified by a merit value of 5; a color formula at 9.0 ¢/lb of material will have a good formula quantified by a merit value of 25; a color formula at 25.0 ¢/lb of material will have an average formula quantified by a merit value of 75; and a color formula at 72.0 ¢/lb of material will have a poor formula quantified by a merit value of 100. For the color blue, a color formula at 2.0 ¢/lb of material will have an excellent formula quantified by a merit value of 5; a color formula at 3.5 ¢/lb of material will have a good formula quantified by a merit value of 25; a color formula at 10.0 ¢/lb of material will have an average formula quantified by a merit value of 75; and a color formula at 28.0 ¢/lb of material will have a poor formula quantified by a merit value of 100. Similar mappings could be generated for other color families. In this table, there is a difference in the mapping for the red and blue color families because the cost of colorants to make a red color tend to be more expensive than the colorants used to make a blue color. Merit values that fall in between the values shown in Table 2 can be determined by using linear interpolation which is well know to skilled artisans. For example, if the color formula had a cost of 9.5 ¢/lb of material for the blue color family, then using linear interpolation, the formula would have a merit value of 71.2. Since 71.2 falls in between 25 and 75, this value will be quantified as an average value.

Another important property is the total loading of colorant in the formula. The total colorant loading of the formula can be characterized in parts per 100 parts of base material such as plastic. The abbreviation of, "pph" is used to represent parts per 100 parts. The total colorant loading, like the cost, is dependent upon the color to be made. Table 3 shows the total colorant loading mapping between the white color family, the dark green color family, and the global merit scale. Historically, whites tend to require much more colorant than a dark green color which is accounted for using this mapping process.

TABLE 3

Mapping Colorant Loading with the Global Scale

| Qualitative Value | Quantitative Value Range | White Color pph | Green Color pph |
|---|---|---|---|
| Excellent | 5 | 3 | 0.4 |
| Good | 25 | 5 | 0.7 |
| Average | 75 | 7 | 1.1 |
| Poor | 100 | 10 | 3.2 |

What table 3 shows is that if you are able to keep the total colorant loading of a white color formula at 4.5 pph then you have a good formula quantified by a merit value of 20 calculated by linear interpolation.

$$Merit=5+(4.5\ pph-3\ pph)\ {}^*(25-5)/(5\ pph-3\ pph)=20.0$$

The value 20 falls between 5 and 25 and is qualified as good.

A formula must also be robust enough to hide color changes in the base material (e.g., plastic) when the material is processed under different conditions. One way to characterize this property of hiding process conditions is to measure the color of the material under normal processing conditions and under abusive processing conditions. The difference in color between these two processing conditions is then measured in $dE^*$ units using the CIE $L^*a^*b^*$ color scale. Table 4 shows the process color change in $dE^*$ units mapped between the gray color family, the light yellow color family, and the global merit scale. Visually, a larger change in color due to processing conditions can be tolerated in a light yellow color than a gray color as shown by this mapping based on historical data.

TABLE 4

Mapping Process Condition Color Changes with the Global Scale

| Qualitative Value | Quantitative Value Range | Gray Color dE* units | Yellow Color dE* units |
|---|---|---|---|
| Excellent | 5 | 0.05 | 0.05 |
| Good | 25 | 0.1 | 0.15 |
| Average | 75 | 0.2 | 0.4 |
| Poor | 100 | 0.5 | 1 |

For the majority of color formulas it is desired to make the material opaque to prevent light from transmitting through the material. Optical density can be used to characterize how much light is transmitted through a sample and is related to the transmission by the following equation.

Optical Density=O.D.=Log10(100%/T)

T=% Transmission

The type of colorants used in a formula and the loading level of the colorants determine the optical density of the material. The qualitative values of optical density is color dependent since it is easier to obtain an opaque gray color formula than in a light red color. Table 5 shows an illustrative mapping of optical density with the global merit scale for a gray and a light red color.

TABLE 5

Mapping Optical Density with the Global Scale

| Qualitative Value | Quantitative Value Range | Gray Color OD units | Red Color OD units |
|---|---|---|---|
| Excellent | 5 | 5.9 | 5.9 |
| Good | 25 | 5.8 | 5 |
| Average | 75 | 5.5 | 2 |
| Poor | 100 | 4 | 1 |

What table 5 shows is that if you are able to keep the optical density of a light red color formula at 3.6 OD units then you have an average formula quantified by a merit value of 48 calculated by linear interpolation.

$$Merit=25+(3.6\ O.D.-5\ O.D.)\ {}^*(75-25)/(2\ O.D.-5\ O.D.)=48.3$$

The value 48 falls between 25 and 75 and is qualified as average.

The above four examples represent the other needs of a color formula besides matching the color. The next two examples shows how the actual color match is mapped to the global merit scale. The color match is characterized by how close the spectral curves match and the metamerism of the color.

The spectral curve match is characterized by the sums of the squared differences in the reflection values at 31 wavelengths from 400 to 700 nm at a 10 nm interval.

The metamerism index is characterized by the sums of the squared differences in the color measured in $dE^*$ units using the CIE $L^*a^*b^*$ color scale at three different standard illuminants. The standard illuminants that are selected are C, D65, and F7 which represent a visual emphasis on the high, middle, and low wavelengths of the spectral curve respectively.

The mapping of these two properties which characterize the color match to the global merit scale are presented in table 6.

TABLE 6

| Mapping Curve Match and Metamerism with the Global Scale | | | |
| --- | --- | --- | --- |
| Qualitative Value | Quantitative Value Range | All Colors Curve Match | All Colors Metamerism |
| Excellent | 5 | 0.000124 | 0.05 |
| Good | 25 | 0.000496 | 0.2 |
| Average | 75 | 0.001984 | 0.5 |
| Poor | 100 | 0.007936 | 1.5 |

Each of the above properties including cost, loading level, optical density, color shift due to normal and abusive processing conditions, metameric index and spectral color match is based on different scales of units. By mapping each of these properties to a global scale through the use of qualitative values such as excellent, good, average, and poor, it becomes possible to compare one property with another.

By mapping out all of the color matching attributes including cost, colorant loading, optical density, color shift due to normal and abusive molding conditions, adjustability of the color formula, metamerism, and spectral color match in above manner, then each attribute is properly scaled to the global scale provided in Table 1.

Referring back to the flow chart of FIG. 3, after all of the quantitative values for the specified color matching attributes have been determined for the case containing a previously used color match, then the quantitative values are aggregated at 46 to generate a merit score. The aggregation is determined by using equation 1.

$$\frac{\Sigma(\text{attributevalue} \times \text{weightingfactor})}{\Sigma(\text{weightingfactors})} \quad (1)$$

In equation 1, the aggregation is attained by summing the product of a quantitative value for each of the specified color matching attributes with its corresponding weighting factor to obtain a first sum and then dividing the first sum with a second sum of all of the weighting factors. An example of how the aggregation in equation 1 is used to generate a merit score is described for specified color matching attributes comprising spectral color curve match, cost of colorant formula, and optical density. For ease of explanation only these three color matching attributes are used. Typically, the other color matching attributes (i.e., colorant loading, color shift, adjustability, and metamerism) would be considered in the aggregation determination. In this example, the user may specify that the spectral color curve match attribute have a weighting factor of 10, the cost attribute have a weighting factor of 1, and the optical density attribute have a weighting factor of 0.01. Thus, the spectral color curve match attribute will be 10 times more important than the cost attribute and 1000 times more important than the optical density attribute. If the case had a quantitative value of 6 for spectral color curve match, a quantitative value of 80 for cost, and a quantitative value of 4 for optical density, then merit score would be 12.7 as determined in equation 2.

$$\frac{(6 \times 10) + (80 \times 1) + (4 \times 0.01)}{(10 + 1 + 0.01)} = 12.7 \quad (2)$$

In the present invention, the lower the merit score, the better the result. Referring back to the flow chart set forth in FIG. 3, if the merit score is within the best five scores, then the score is saved at 48. Alternately, if the score is not within the best five, then it is not saved.

After generating a merit score for the case, the processor 22 evaluates the next case, if it has been determined that there are more cases of previously used color matches to be evaluated at 50. The next case is then retrieved at 52 and steps 42–48 are repeated so that another merit score is generated. These steps continue until the processor 22 determines that there are no more cases of previously used color matches to be evaluated at 50. Once all of the cases have been evaluated, then the color formulas from the five best cases (i.e., the cases with the lowest scores) are examined at 54 to determine which formula provide the best match with the color standard. If necessary, the color formula is adapted at 56 until it can reproduce the color standard. The colorant loading and relative colorant proportion of the color formula from the best match is then reproduced at 58. If this color formula does not provide a satisfactory match, then the user can try any one of the formulas from the set of low merit scores.

This invention provides a method to evaluate a given set of colorant proportions and loadings. This evaluation method can be used to find locally optimal solutions by simply searching for the formula that provides the best evaluation.

It is therefore apparent that there has been provided in accordance with the present invention, a method and system for determining optimum colorant loading using merit functions that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

The invention claimed is:

1. A computer-implemented method for determining total colorant loading and relative colorant proportions for a color formula used for reproducing a color standard according to desired property and appearance specifications, the method comprising the steps of:

measuring spectral reflectance of the color standard;

specifying a plurality of color matching attributes used for attaining a match with the color standard that are in accordance with the desired property and appearance specifications;

developing a merit function scale for quantifying how well a previously used color match corresponds to the color standard for each of the specified plurality of color matching attributes, the merit function scale comprising a plurality of qualitative descriptions for each of the specified plurality of color matching attributes and a corresponding range of quantitative values;

searching a plurality of previously used color matches and using the merit function scale for determining a set of color matches that best approximates the color standard;

determining a color match from the set of previous color matches that optimally reproduces the color standard; and using colorant loading and relative colorant proportions of a color formula from the color match to reproduce the color standard.

2. The computer-implemented method according to claim 1, wherein the spectral reflectance of the color standard is measured by a spectrophotometer.

3. The computer-implemented method according to claim 1, wherein the specifying step comprises designating relative importance of each of the plurality of color matching attributes with a weighting factor.

4. The computer-implemented method according to claim 3, wherein the plurality of color matching attributes comprise spectral reflectance, total colorant loading, cost of color formula, optical density, color shift, metamerism, and adjustability.

5. The computer-implemented method according to claim 3, wherein the searching step comprises:

using the merit function scale to determine the quantitative values for each of the specified color matching attributes for each of the previously used color matches;

aggregating the quantitative values of the color matching attributes with the corresponding weighting factors to generate a merit score;

ranking the merit scores of all of the plurality of previously used color matches; and retrieving a set of color matches having the best merit scores.

6. The computer-implemented method according to claim 5, wherein the aggregating step comprises summing the product of the quantitative value for each of the color matching attributes with the corresponding weighting factor to obtain a first sum and dividing the first sum with a second sum of all of the weighting factors.

7. The computer-implemented method according to claim 5, wherein the retrieving step comprises retrieving the merit scores having the lowest scores.

8. The computer-implemented method according to claim 1, wherein the qualitative descriptions of the merit function scale comprise excellent, good, average, and poor.

9. The computer-implemented method according to claim 1, further comprising adapting the colorant loading and relative colorant proportions of the color formula of the color match if necessary to obtain an acceptable match with the color standard.

10. A system for determining total colorant loading and relative colorant proportions for a color formula used for reproducing a color standard according to desired property and appearance specifications, the system comprising:

a spectrophotometer for measuring spectral reflectance of the color standard; and a processor for determining total colorant loading and relative colorant proportions for a color formula that matches the color standard, the processor comprising means for specifying a plurality of color matching attributes used for attaining a match with the color standard that are in accordance with the desired property and appearance specifications; means for developing a merit function scale for quantifying how well a previously used color match corresponds to the color standard for each of the specified plurality of color matching attributes, the merit function scale comprising a plurality of qualitative descriptions for each of the specified plurality of color matching attributes and a corresponding range of quantitative values; means for searching a plurality of previously used color matches and using the merit function scale for determining a set of color matches that best approximates the color standard; means for determining a color match from the set of previous color matches that optimally reproduces the color standard; and means for using colorant loading and relative colorant proportions of a color formula from the color match to reproduce the color standard.

11. The system according to claim 10, wherein the specifying means designates relative importance of each of the plurality of color matching attributes with a weighting factor.

12. The system according to claim 11, wherein the plurality of color matching attributes comprise spectral reflectance, total colorant loading, cost of color formula, optical density, color shift, metamerism, and adjustability.

13. The system according to claim 11, wherein the searching means comprises:

means for using the merit function scale to determine the quantitative values for each of the specified color matching attributes for each of the previously used color matches;

means for aggregating the quantitative values of the color matching attributes with the corresponding weighting factors to generate a merit score;

means for ranking the merit scores of all of the plurality of previously used color matches; and means for retrieving a set of color matches having the best merit scores.

14. The system according to claim 13, wherein the aggregating means sums the product of the quantitative value for each of the color matching attributes with the corresponding weighting factor to obtain a first sum and divides the first sum with a second sum of all of the weighting factors.

15. The system according to claim 13, wherein the retrieving means retrieves the merit scores having the lowest scores.

16. The system according to claim 10, wherein the qualitative descriptions of the merit function scale comprise excellent, good, average, and poor.

17. The system according to claim 10, further comprising means for adapting the colorant loading and relative colorant proportions of the color formula of the color match if necessary to obtain an acceptable match with the color standard.

* * * * *

UNITED STATES PATENT AND TRADEMARK OFFICE
CERTIFICATE OF CORRECTION

PATENT NO. : 5,740,078
DATED : April 14, 1998
INVENTOR(S) : William Estel Cheetham, et al It is certified that error appears in the above-indentified patent and that said Letters Patent is hereby corrected as shown below:

On the title page, item [19] "Cheetam   should read -- Cheetham--
item [75] "William Estel Cheetam" should read
-- William Estel Cheetham --

Signed and Sealed this

Twenty-first Day of July, 1998

*Attest:*

BRUCE LEHMAN

*Attesting Officer*         *Commissioner of Patents and Trademarks*